United States Patent [19]

Wagner

[11] Patent Number: 5,230,452

[45] Date of Patent: Jul. 27, 1993

[54] TACKLE BELT APPARATUS

[76] Inventor: Robert W. Wagner, 200 Laurel, Broomfield, Colo. 80020

[21] Appl. No.: 835,317

[22] Filed: Feb. 14, 1992

[51] Int. Cl.⁵ .................................................. A45F 5/00
[52] U.S. Cl. .................................... 224/240; 224/253; 206/315.11; 206/409
[58] Field of Search ............... 224/191, 195, 197, 224, 224/225, 226, 240, 253, 271; 24/697.1; 220/329; 206/315.11, 408, 409, 397

[56] References Cited

U.S. PATENT DOCUMENTS

| | | | |
|---|---|---|---|
| 1,651,921 | 12/1927 | Felz | 224/240 |
| 1,835,749 | 12/1931 | Behrman | 150/112 X |
| 2,560,381 | 7/1951 | Babington | 224/197 |
| 2,670,981 | 3/1954 | Wenham | 292/DIG. 37 |
| 3,297,217 | 1/1967 | Nichols | 224/240 |
| 3,739,518 | 6/1973 | Ziegler | 206/315.11 X |
| 3,743,147 | 7/1973 | Wilczynski | 224/271 X |
| 3,919,615 | 11/1975 | Niecke | 224/226 X |
| 4,676,419 | 6/1987 | Victor | 224/253 X |
| 4,708,244 | 11/1987 | Fish et al. | 206/315.11 |
| 4,739,809 | 4/1988 | Adams | 150/112 |
| 4,844,373 | 7/1989 | Fike, Sr. | 206/397 X |
| 4,957,231 | 9/1990 | Kalisher | 224/240 X |
| 5,014,891 | 5/1991 | King | 224/253 X |

FOREIGN PATENT DOCUMENTS 1385805  12/1964  France ............................ 220/529

Primary Examiner—Allan N. Shoap
Assistant Examiner—Chris McDonald
Attorney, Agent, or Firm—Leon Gilden

[57] ABSTRACT

A flexible belt web arranged for mounting about a waist portion of an individual includes a plurality of containers to include a first, second, third, fourth, fifth, and sixth container to secure various components, with each container uniquely configured to accommodate fishing components therewithin.

1 Claim, 4 Drawing Sheets

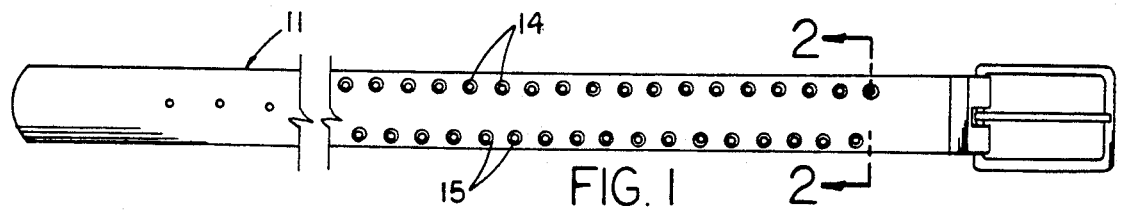
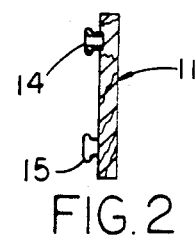
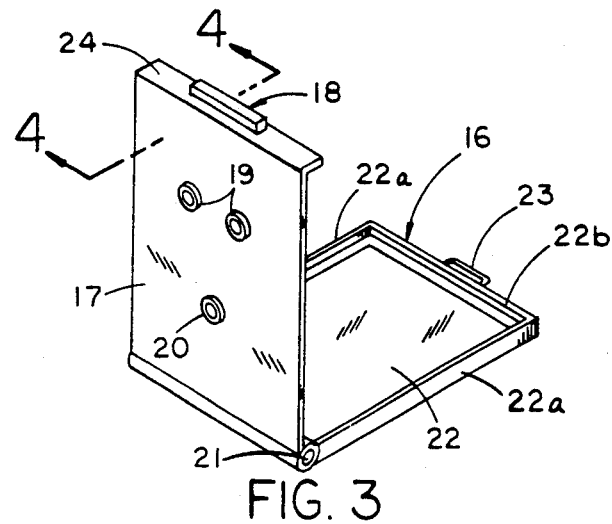
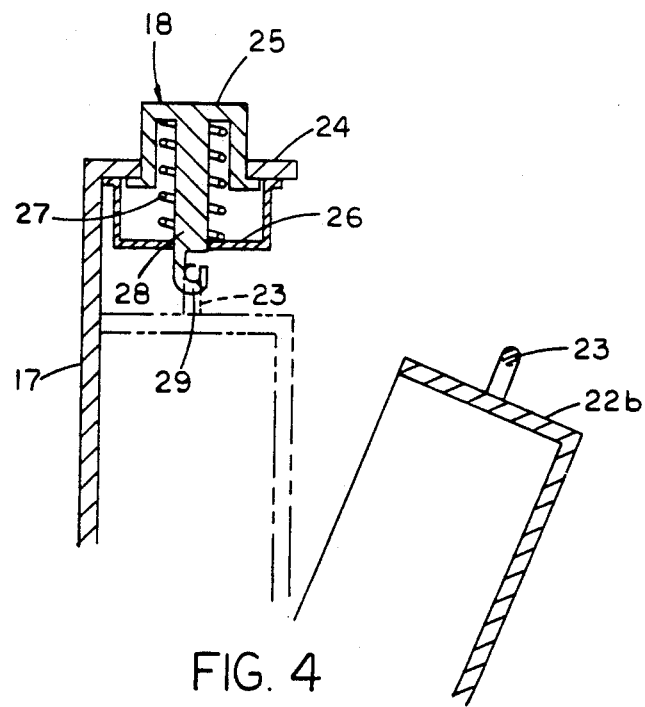

TACKLE BELT APPARATUS

BACKGROUND OF THE INVENTION

1. Field of the Invention

The field of invention relates to tackle and fishing apparatus, and more particularly pertains to a new and improved tackle belt apparatus wherein the same is arranged for torso support relative to an individual.

2. Description of the Prior Art

Belt structure for mounting tackle structure in a fishing procedure has been utilized in the prior art to free an individual's arms and position such structure in a convenient orientation for use. Such prior art is exemplified in U.S. Pat. No. 3,524,571 to Young, et al. wherein a tackle box includes a cylindrical member including a lid rotatably mounted within the cylindrical member to provide access to a cavity within the cylindrical member.

U.S. Pat. No. 4,323,181 to Spasoff sets forth a belt mounted fishing tackle carrier securing a plurality of rigid support structure thereto.

U.S. Pat. No. 4,957,231 to Kalisher sets forth a tackle box belt, wherein the belt includes a series of containers secured thereto in addition to a plurality of loop hangers.

As such, it may be appreciated that there continues to be a need for a new and improved tackle belt apparatus which addresses both the problems of ease of use as well as effectiveness in construction and in this respect, the present invention substantially fulfills this need.

SUMMARY OF THE INVENTION

In view of the foregoing disadvantages inherent in the known types of tackle belt apparatus now present in the prior art, the present invention provides a tackle belt apparatus wherein the same utilizes a plurality of uniquely configured containers to accommodate various fishing components therewithin. As such, the general purpose of the present invention, which will be described subsequently in greater detail, is to provide a new and improved tackle belt apparatus which has all the advantages of the prior art tackle belt apparatus and none of the disadvantages.

To attain this, the present invention provides a flexible belt web arranged for mounting about a waist portion of an individual, including a plurality of containers to include a first, second, third, fourth, fifth, and sixth container to secure various components, with each container uniquely configured to accommodate fishing components therwithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tackle belt apparatus which has all the advantages of the prior art tackle belt apparatus and none of the disadvantages.

It is another object of the present invention to provide a new and improved tackle belt apparatus which may be easily and efficiently manufactured and marketed.

It is a further object of the present invention to provide a new and improved tackle belt apparatus which is of a durable and reliable construction.

An even further object of the present invention is to provide a new and improved tackle belt apparatus which is susceptible of a low cost of manufacture with regard to both materials and labor, and which accordingly is then susceptible of low prices of sale to the consuming public, thereby making such tackle belt apparatus economically available to the buying public.

Still yet another object of the present invention is to provide a new and improved tackle belt apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the belt structure utilized by the invention.

FIG. 2 is an orthographic view, taken along the lines 2—2 of FIG. 1 in the direction indicated by the arrows.

FIG. 3 is an isometric illustration of a first container utilized by the invention.

FIG. 4 is an orthographic view, taken along the lines 4—4 of FIG. 3 in the direction indicated by the arrows.

DESCRIPTION OF THE PREFERRED EMBODIMENT

Figure 5:
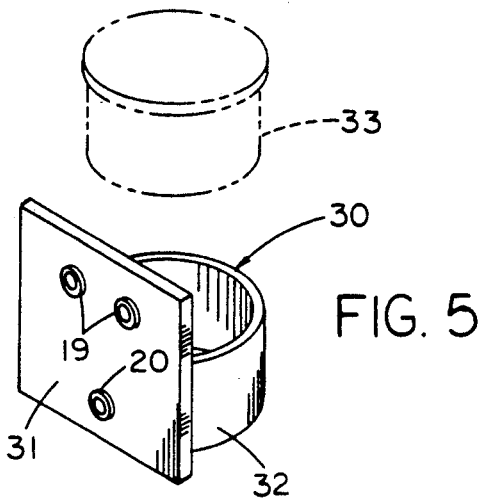
FIG. 5 is an isometric illustration of a second container utilized by the invention.

With reference now to the drawings, and in particular to FIGS. 1 to 15 thereof, a new and improved tackle belt apparatus embodying the principles and concepts of the present invention and generally designated by the reference numerals 11 through 63 will be described.

More specifically, the tackle belt apparatus of the invention essentially comprises a flexible belt member 11 arranged for securement about a waist portion of an individual for support of various containers to be secured thereto. The flexible belt member 11 includes a buckle 12 arranged for securement to an attaching means 13 at an opposed distal end of the belt, such as apertures as illustrated in FIG. 1. A first row of first fasteners 14 is spaced apart a predetermined spacing adjacent an upper edge of the flexible belt member 11 on a forward face thereof, with a second row of fasteners 15 positioned to the forward face of the belt member 11 adjacent the lower edge thereof and offset relative to the first row of each snap fastener 15 spaced apart the predetermined spacing and positioned below and bisecting a plurality of upper snap fasteners 14.

Figure 6:
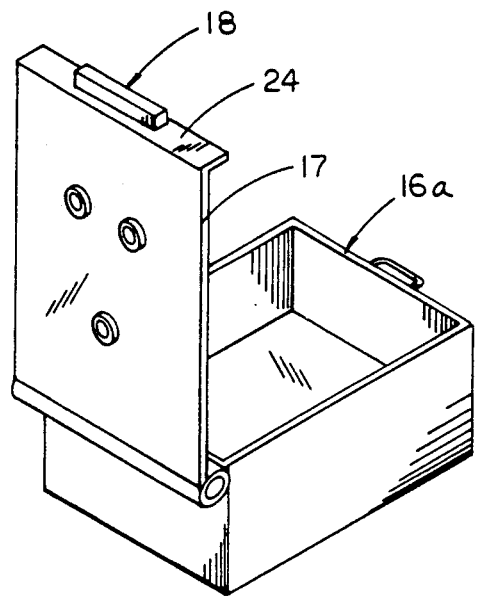
FIG. 6 is an isometric illustration of an enlarged first container structure utilized by the invention.

A first container 16 for storing casting flies, lures, hooks, sinkers, and the like for utilization in fishing includes a first container rigid mounting plate 17 including a latch 18 mounted to a mounting plate top wall 24. A single further snap fastener 20 mounted to a rear surface of the mounting plate 17 is positioned medially and below a plurality of second snap fasteners 19 spaced apart the predetermined spacing. The second snap fasteners 19 and 20 are arranged for securement to the first snap fasteners 14 and 15 in a selected orientation for securement to the belt member 11. A first container hinge 21 is mounted to a lower distal end of the mounting plate 17 and secured to a lower distal end of a first container tray 22 to hingedly mount the tray 22 to the first container mounting plate 17. The tray 22 includes tray side walls 22a and a top wall 22b for storage within the tray 22. The top wall 22b includes a top wall loop 23 cooperative with the first container latch 18. In more specificity, the latch 18 includes a latch button member 25 reciprocatably mounted through a mounting plate top wall 24 that is oriented parallel to and spaced above the tray top wall 22b when the tray is in contiguous communication with the interior surface of the first container mounting plate 17, as illustrated in phantom in FIG. 4. The latch button member 25 is reciprocatably mounted with the latch button well 26 directed below and fixedly secured to the mounting plate top wall 24, with a spring 27 captured between the latch button member 25 and the well 26. The latch button member 25 includes a projecting leg 28 orthogonally oriented relative to the mounting plate top wall 24 projecting below and directed through the well 26 terminating in a projecting leg hook 29 selectively securable through the top wall loop 23 when the tray 22 is in a first position. The FIG. 6 illustrates a modified or enlarged first container 16a for enhanced storage capacity.

The FIG. 5 sets forth the use of a second container 30 for securement of fish eggs and bait therewithin, wherein the second container 30 is arranged for complementarily securing a fluid impermeable container 33. The second container 30 accordingly includes a second container mounting plate 31, including a rear surface to position fixedly thereon the upper and lower second snap fasteners 19 and 20 securable to the first and second row of snap fasteners 14 and 15. A cylindrical container 32 fixedly mounted to a forward surface of the second container mounting plate 31 is oriented to position its axis parallel to the mounting plate 31 and the cylindrical container 32 configured for complementary reception of the fluid impermeable container 33 therewithin.

Figure 7:
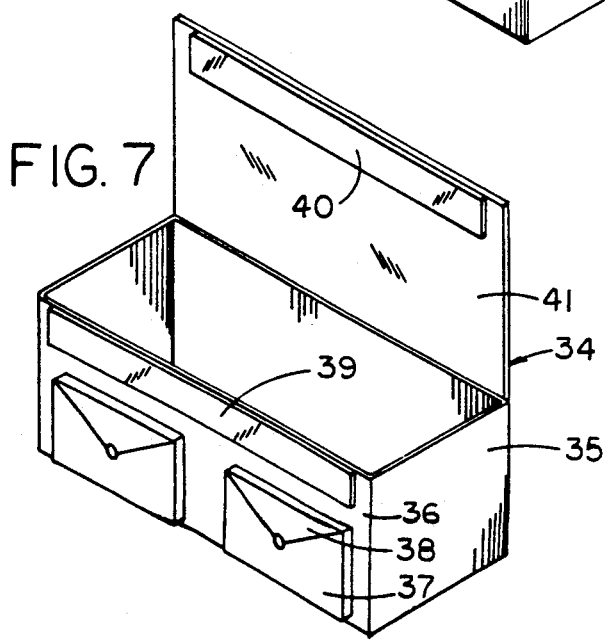
FIG. 7 is an isometric illustration of a third container structure utilized by the invention.
Figure 8:
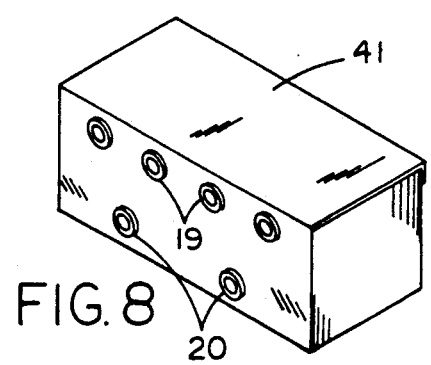
FIG. 8 is an isometric illustration of a rear view of the third container structure utilized by the invention.

FIGS. 7 and 8 illustrate the use of third container 34 formed of a rigid construction, with the container front wall 36 including a plurality of front wall storage bags 37 mounted thereto, with each storage bag 37 including a flap cover 38 to accommodate various components such as leader lines and the like. The flexible container 35 includes the positioning of tools and tackle components for storage therewithin, wherein a first hook and loop fastener strip 39 is mounted to the container front wall 36 at an upper edge thereof for cooperation with a second hook and loop fastener strip 40 mounted to a cover flap 41 hingedly mounted to the container 35. The rear wall of the third container 34 includes the plurality of upper and lower second snap fasteners 19 and 20 for cooperation with the first and second rows of first snap fasteners 14 and 15 respectively.

Figure 9:
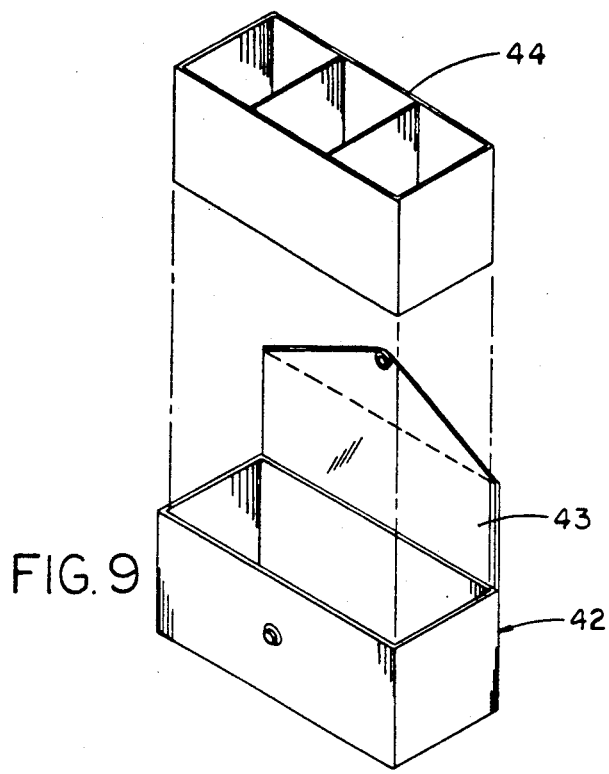
FIG. 9 is an isometric illustration of a fourth container utilized by the invention.
Figure 10:
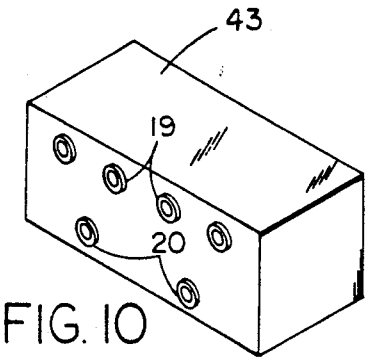
FIG. 10 is an isometric rear view of the fourth container utilized by the invention.
Figure 11:
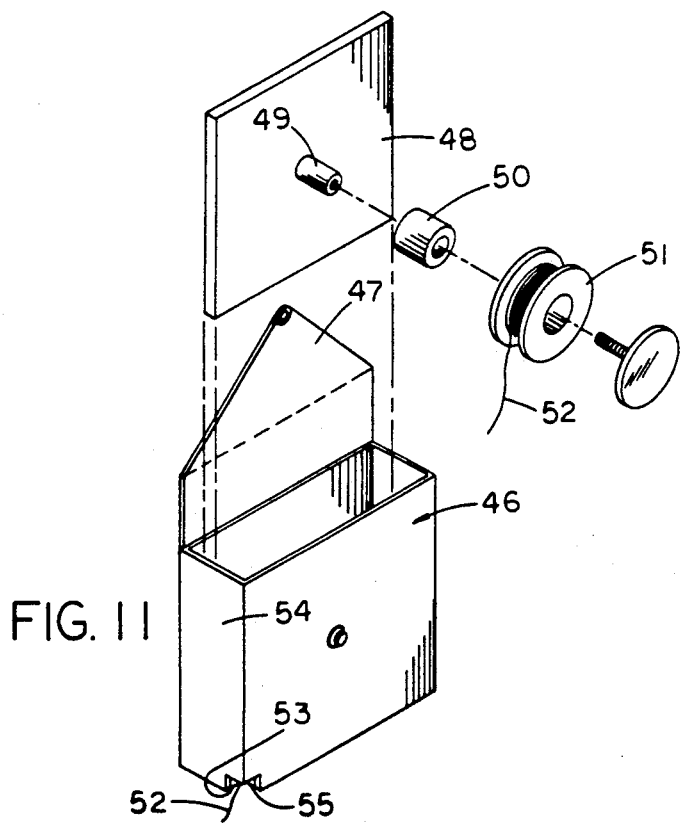
FIG. 11 is an isometric illustration of a fifth container structure utilized by the invention.
Figure 12:
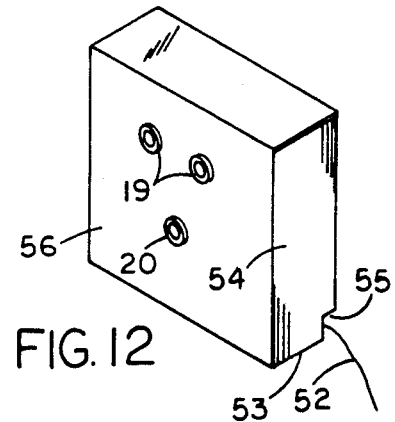
FIG. 12 is an isometric rear view of the fifth container structure utilized by the invention.
Figure 13:
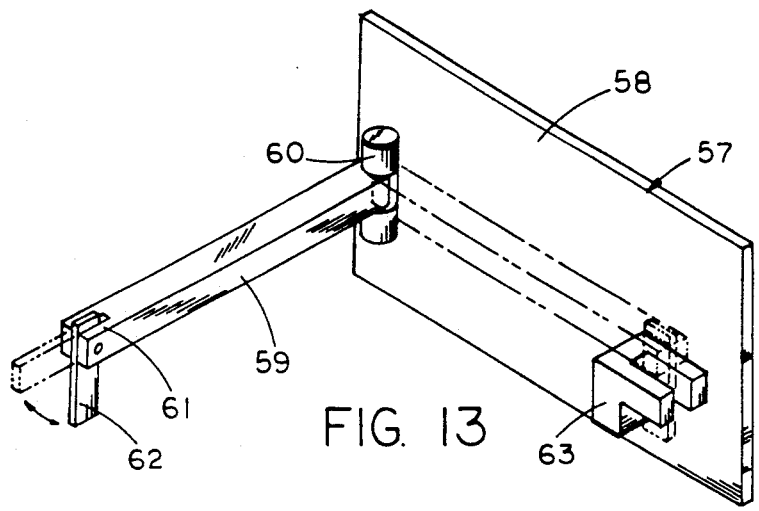
FIG. 13 is an isometric illustration of a sixth container structure.
Figure 14:
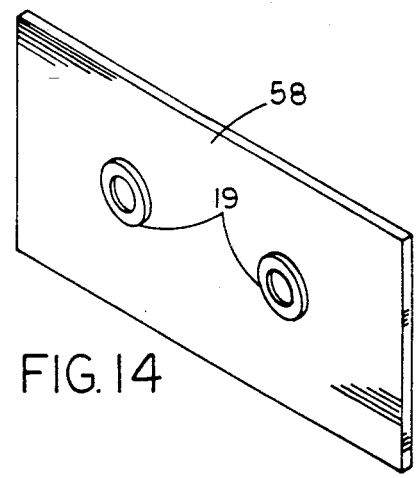
FIG. 14 is an isometric rear view of the sixth container structure.
Figure 15:
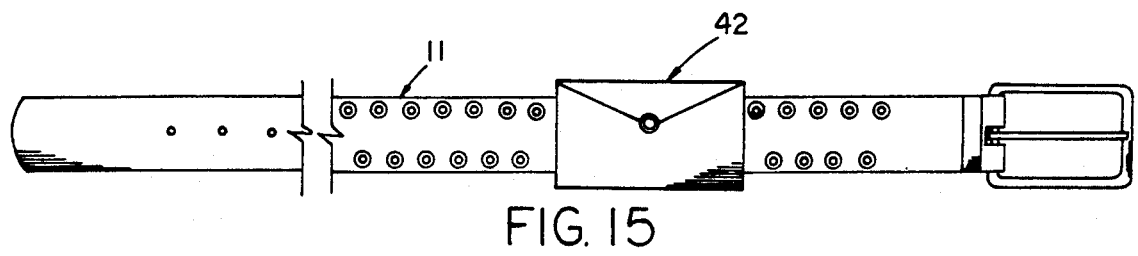
FIG. 15 is an orthographic view illustrating typical positioning of a container structure onto the belt member of the invention.

A fourth flexible container 42 is illustrated in FIG. 9 and includes a fourth container cover flap 43 for overlying securement to the fourth container, with an inner cavity of the fourth container including a rigid compartmented insert 44 slidably positionable therewithin, with the compartmented insert 44 arranged for segregation of various fishing lures and the like for use by the invention. The fourth container rear wall 45 includes the plurality of upper and lower second snap fasteners 19 and 20, in a manner for securement to the belt member 11 as discussed above.

A fifth container 46 is arranged for securement of fishing line 52 about a spool 51 for use in the construction of leader lines and the like. A fifth container flap 47 is arranged for covering the fifth container cavity, wherein a fifth container rigid mounting plate 48 is provided and includes an axle 49 medially and orthogonally projecting forwardly of a forward face of the fifth container mounting plate 48. The axle 49 includes a bushing 50 in surrounding relationship relative to the axle 49, wherein the bushing 50 rotatably secures the spool 51 in a rotative manner relative to the axle 49 and the fifth container mounting plate 48. The fifth container includes a fifth container floor 53 in cooperation with a front wall and a fifth container side wall 54, with a fifth container opening 55 directed through a corner defined by an intersection of a side wall 54, the front wall, and the floor 53 of the fifth container to direct the fishing line 52 therethrough for convenience and access by a fisherman in use. The rear surface of the fifth container rear wall 56 includes the upper and lower second fasteners 19 and 20 for securement to the belt 11.

A sixth container 57 is provided and configured as a sixth container mounting plate 58 including a support arm 59 pivotally mounted thereto. A rear distal end of the support arm 59 includes a support arm hinge 60 hingedly securing in a pivotal relationship the support arm 59 to the sixth container mounting plate 58 forward surface, with a forward distal end of the support arm 59 terminating in a bifurcated forward distal end 61, with a latch leg 62 pivotally mounted within the bifurcated forward distal end 61, with the latch leg 62 arranged for reception within a bifurcated boss 63 that is fixedly mounted to the sixth container mounting plate 58 and spaced from the hinge 60 a predetermined length substantially equal to a predetermined length defined by the support arm 59. The support arm 59 is arranged for the support of a stringer for ease of access thereto, wherein the pivoting motion of the support arm 59 provides ease of positioning of the stringer for use by a fisherman. It is understood that VELCRO TM may be used in lieu of the snap fasteners.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tack belt apparatus for supporting various fishing components, wherein the apparatus comprises, a flexible belt member, the flexible belt member including a belt member first end and a belt member second end, the belt member first end including first buckle means and the second end including securement means, wherein the buckle means is arranged for securement in cooperation with the securement means for securing the belt member about an individual's waist, the belt member including a belt member upper edge and a belt member lower edge, wherein a first row of first snap fasteners is directed along a forward surface of the belt member adjacent the belt member upper edge, and a second row of second snap fasteners mounted to the forward surface positioned adjacent a belt member lower edge and arranged in an offset relationship relative to the first row of snap fasteners positioned therebelow, wherein the first row of first snap fasteners are each spaced apart a predetermined spacing, and the second row of second snap fasteners are spaced apart the predetermined spacing, and including a plurality of containers for selective securement to the first row of snap fasteners and the row of snap fasteners, and the plurality of containers includes a first container, wherein the first container is formed with a rigid mounting plate, the rigid mounting plate including a mounting plate top wall projecting orthogonally forwardly of the mounting plate mounted to an upper distal end of the first container mounting plate, and a lower distal end of the first container mounting plate including a hinge member mounted thereto, the hinge member including a tray member secured to the hinge member, wherein the tray includes a plurality of parallel tray side walls and a tray top wall, the tray top wall is spaced from the hinge member a first length and the mounting plate top wall is spaced from the hinge member a second length, wherein the second length is greater than the first length, and the tray top wall includes a top wall loop, and the mounting plate top wall includes a latch member, wherein the latch member is arranged for securement to the top wall loop, and the latch member includes a latch button member reciprocatingly directed through the mounting plate top wall, and a latch button well positioned fixedly to the top wall to a bottom surface thereof receiving a latch button member therewithin, and a latch button spring captured between the well and the latch button member to bias the latch button member exteriorly of the latch button well, the latch button member including a projecting leg directed below the well and fixedly secured to the latch button member when the projecting leg terminates in a projecting leg hook arranged for receiving the top wall loop for securement of the tray member to the first container mounting plate, and the first container mounting plate includes a first container mounting plate rear surface, the first container mounting plate rear surface includes a plurality of snap fasteners arranged for securement to the first and second row of first snap fasteners, and the plurality of containers includes a second container, the second container includes a second container mounting plate, the second container mounting plate including a cylindrical container fixedly secured to the second container mounting plate, wherein the cylindrical container includes a cylindrical container axis and the cylindrical container axis arranged parallel relative to the mounting plate, and a fluid impermeable container complementarily received within the cylindrical container, and the second container mounting plate including a second container mounting plate rear surface, including a plurality of second snap fasteners for securement to the first and second row of first snap fasteners, and a third container, the third container including a container front wall, the container front wall including a plurality of storage bags secured to the front wall, and the storage bags each including a storage bag flap for overlying securement relative to each storage bag, and a third container further including a third container cover flap arranged for overlying a third container cavity within the third container, and a fourth flexible container, the fourth flexible container including a rigid compartmented insert selectively received in a sliding relationship within the fourth container, the fourth container including a plurality of second snap fasteners for securement to the first snap fasteners of the belt member, and including a fifth container, the fifth container including a fifth container cavity, the fifth container cavity including a fifth container rigid mounting plate slidably received within the fifth container cavity, the fifth container rigid mounting plate including a rigid mounting plate planar forward surface, the rigid mounting plate planar forward surface including an axle fixedly and medially mounted thereto in an orthogonal relationship, and an axle bushing arranged in surrounding relationship relative to the axle, and a spool rotatably mounted about the axle bushing, and fishing line container about the spool, and the fifth container including a fifth container floor, and a fifth container side wall, and a container front wall, and a fifth container opening directed through an intersection of the fifth container floor, the fifth container side wall, and the fifth container front wall, with the fishing line directed therethrough, the fifth container further including a fifth container rear wall including a plurality of second snap fasteners for securement to the first snap fasteners, and including a sixth container, the sixth container including a rigid sixth container mounting plate, and a support arm pivotally mounted to the sixth container mounting plate, the support arm including a support arm hinge hingedly mounting the support arm to the mounting plate, and the support arm including a bifurcated forward distal end spaced from the hinge a predetermined length, and a latch leg pivotally mounted within the bifurcated forward distal end, and a bifuracted boss fixedly mounted to the mounting plate spaced from the hinge a predetermined length for reception of the latch leg therewithin.

* * * * *